United States Patent
Ramey et al.

(10) Patent No.: US 9,202,197 B1
(45) Date of Patent: Dec. 1, 2015

(54) SORT BIN ASSIGNMENT

(71) Applicant: Amazon Technologies, Inc., Reno, NV (US)

(72) Inventors: Patrick W. Ramey, Mountlake Terrace, WA (US); Cherie G. Wong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/190,408

(22) Filed: Feb. 26, 2014

Related U.S. Application Data

(63) Continuation of application No. 12/198,174, filed on Aug. 26, 2008, now Pat. No. 8,682,473.

(51) Int. Cl.
*G06F 7/00* (2006.01)
*G06Q 10/08* (2012.01)

(52) U.S. Cl.
CPC .................................. *G06Q 10/087* (2013.01)

(58) Field of Classification Search
CPC ...... G06Q 10/087; G06Q 10/08; A61J 7/0084
USPC ........................................................ 700/216
See application file for complete search history.

(56) References Cited

U.S. PATENT DOCUMENTS

| 5,877,962 | A | * | 3/1999 | Radcliffe | 700/215 |
|---|---|---|---|---|---|
| 6,876,958 | B1 | | 4/2005 | Chowdhury et al. | |
| 7,139,637 | B1 | | 11/2006 | Waddington et al. | |
| 7,246,706 | B1 | | 7/2007 | Shakes et al. | |
| 7,331,471 | B1 | * | 2/2008 | Shakes et al. | 209/630 |
| 2005/0284934 | A1 | * | 12/2005 | Ernesti et al. | 235/385 |
| 2006/0206235 | A1 | | 9/2006 | Shakes et al. | |
| 2007/0021863 | A1 | | 1/2007 | Mountz et al. | |
| 2007/0027577 | A1 | | 2/2007 | Lunak et al. | |
| 2007/0150383 | A1 | | 6/2007 | Shakes et al. | |
| 2008/0183327 | A1 | | 7/2008 | Danelski | |

* cited by examiner

*Primary Examiner* — Kyle Logan
(74) *Attorney, Agent, or Firm* — Thomas | Horstemeyer, LLP

(57) ABSTRACT

Disclosed are various systems, methods, and other embodiments involving assignment and use of sort bins in a materials handling center. A manifest is generated in a computer system that directs a picking of a plurality of items from a plurality of inventory locations in a materials handling center in fulfillment of a plurality of orders for the purchase of the items. Sort bin assignments are generated in the computer system before picking the items. Each sort bin assignment corresponds to a respective one of the items, and each of the sort bin assignments specifies a corresponding one of a plurality of sort bins designated to coalesce together the items associated with respective ones of the orders for packing. The sort bin assignments are stored in memory for use in sorting the items.

20 Claims, 4 Drawing Sheets

SORT BIN ASSIGNMENT

CROSS REFERENCE TO RELATED APPLICATIONS

This application is a continuation of, and claims priority to, U.S. Patent Application entitled "SORT BIN ASSIGNMENT," filed on Aug. 26, 2008 and assigned application Ser. No. 12/198,174, now issued as U.S. Pat. No. 8,682,473, which is incorporated herein by reference in its entirety.

BACKGROUND

In a materials handling center, it is often the case that orders for goods are fulfilled by pulling items off of shelves, packaging the items, and shipping them to a destination address. In some situations, items for multiple different orders may be combined on a conveyor or in a batch that need to be sorted in order to package items that are subject to the same order together to ship to a given destination address.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
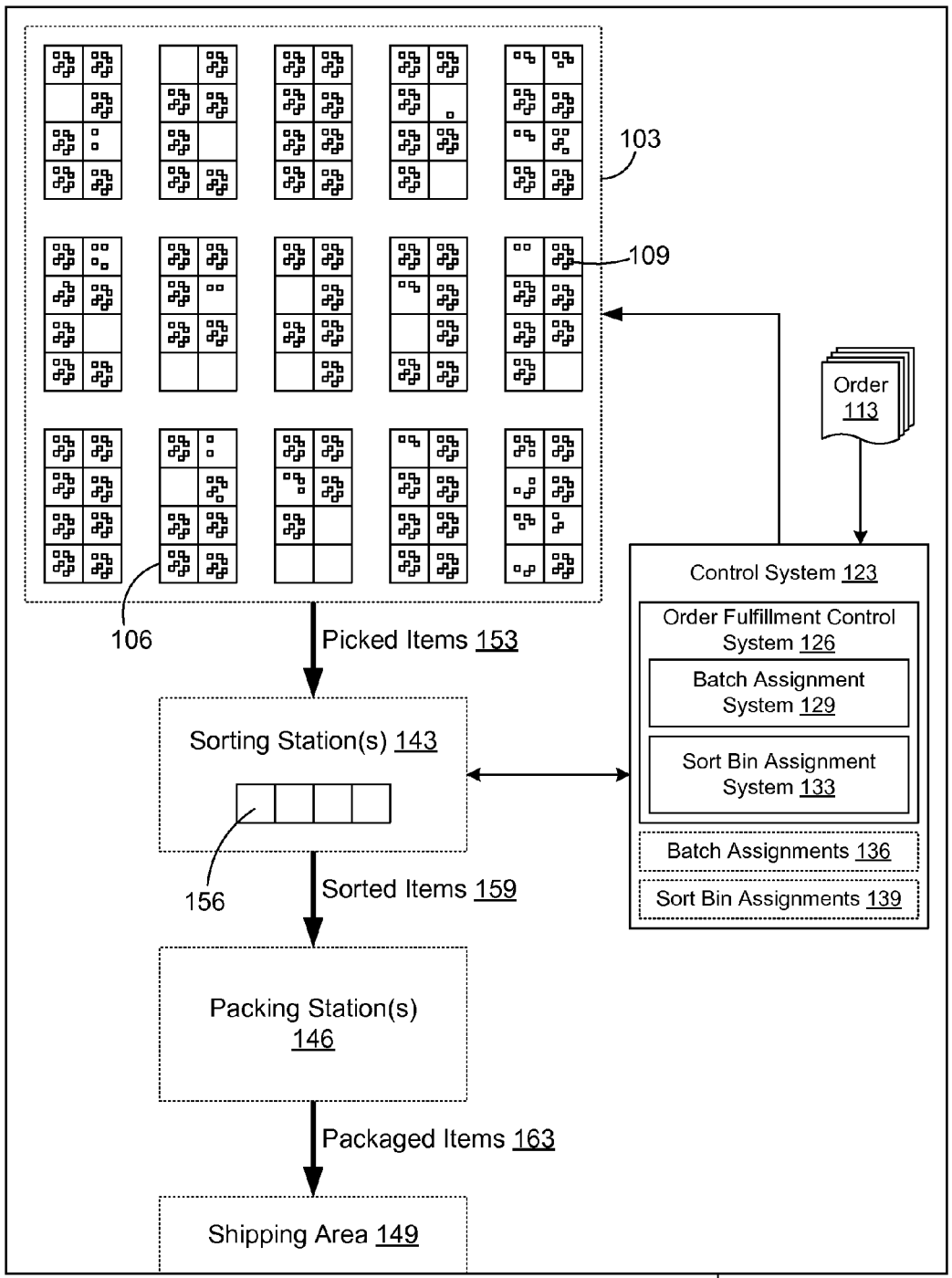
FIG. 1 is a drawing that illustrates the operation of a materials handling center according to an embodiment of the present disclosure.

With reference to FIG. 1, shown is a drawing that depicts one example of a materials handling facility 100 according to an embodiment of the present disclosure. A materials handling facility 100 may include one or more of, but are not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the materials handling facility 100 is described herein with specific reference to a fulfillment center, it is understood that a materials handling facility 100 provides one example of many other types of environments to which the principles described herein apply.

According to the illustration provided herein, the materials handling facility 100 may comprise, for example, a large warehouse or other structure that includes and inventory storage area 103 having a plurality of inventory locations 106. The inventory locations 106 are generally locations configured for the storage of an inventory of items 109. To this end, the inventory locations 106 may comprise, for example, bins, slots, shelves, containers, receptacles, crates, stalls, cribs, cordoned areas, hooks, racks, or other locations, etc. The items 109 are stored in the inventory locations 106 as can be appreciated. The materials handling center 100 may be configured to provide for the fulfillment of orders 113 received for the purchase of the items 109 as will be described.

The items 109 may comprise, for example, products that are purchased by customers through various channels. Such products may be any type of product that can be purchased and delivered to customers such as, for example, clothing items, retail goods, hardware, electronics, toys, media items, edible items, and any other products.

Associated with the materials handling center 100 is a control system 123 that orchestrates the operation of the materials handling center 100 in fulfilling orders for the purchase of items 109 or orders for the movement of items 109 to other materials handling centers 100 as will be described. To this end, the control system 123 may comprise, for example, one or more processor based systems such as servers, clients, and/or other systems. In one embodiment, the control system 123 may comprise a plurality processor based systems that communicate with each other via an appropriate network such as a local area network, wireless network, or other type of network as of can be appreciated.

Executed within the control system 123 is an order fulfillment control system 126. Among the various portions of the order fulfillment control system 126 are a batch assignment system 129 and a sort bin assignment system 133. During operation, the batch assignment system 129 may generate batch assignments 136 that relate to the picking of items 109 for a group of one or more orders 113 to be fulfilled. Also, the sort bin assignment system 133 may generate sort bin assignments 139 that are stored in a memory for use in guiding an individual who sorts items picked from the inventory storage area 103 as will be described.

Materials handling center 100 further includes various sorting stations 143, packing stations 146, and shipping areas 149. In some situations, the items 109 from many different orders 113 are picked from the inventory locations 106 and flow as picked items 153 to one or more sorting stations 143. To this end, various batches of orders 113 may be picked at the same time and flow together to a given sorting station 143, where the items 109 associated with multiple orders 113 are intermingled on a cart, in totes, or on a conveyor that is received at sorting stations 143. Each of the sorting stations 143 includes a plurality of sort bins 156 that are used to sort the items 109 so as to coalesce together the items 109 associated with respective ones of the orders 113 for packing.

The sorted items 159 then flow to packing stations 146 for packing for shipment. Alternatively, sorted items 159 may flow to other processing stations such as, for example, gift wrapping stations to be gift wrapped before being applied to a packing station 146 for packaging for shipment. Once items are packaged, then the packaged items 163 are forwarded to shipping to be placed on transports such as delivery trucks for shipment to destination addresses.

Next, a description of the general operation of materials handling center 100 is provided according to various embodiments. To begin, the control system 123 receives orders 113 for the purchase of items 109 from an order generation system. Such an order generation system may comprise, for example, an electronic commerce application that facilitates the ordering and purchasing of goods over the internet or other networks as can be appreciated. Such systems are employed, for example, by on-line merchants that sell their products via an Internet presence. Alternatively, the orders 113 may be generated by telephone through telephone operators. Orders 113 for items may also be generated using kiosks or other order generation systems located in stores or other locations as can be appreciated.

Regardless how orders 113 for items 109 are generated, the orders 113 are received by the order fulfillment control system 126 that implements fulfillment of such orders 113. In doing so, the order fulfillment control system 126 may be configured to execute the batch assignment system 129 and the sort bin assignment system 133 as described above.

Assuming that several orders 113 for items 109 have been received by the order fulfillment control system 126, then the batch assignment system 129 generates one or more manifests that direct the picking of items 109 from various inventory locations 106 in the materials handling center 100 in fulfillment of the orders 113 for the purchase of the items 109. Each of the manifests may dictate picker routes that individuals known as "pickers" follow through the inventory storage area 103 of the materials handling center 100 in order to pick items 109 from the inventory locations 106 to be transported as picked items 153 to one or more sorting stations 143.

According to one embodiment, picked items 153 may be provided to the sorting stations 143 in batches as orchestrated by the batch assignment system 129. For example, multiple manifests may orchestrate the picking of items 109 for multiple orders 113, where the carts, totes, or other transport devices include items 109 for multiple different orders 113 and where all the items 109 are associated with a given batch. To this end, it is possible that multiple transport devices such as carts, totes, or other transport devices may include items 109 associated with multiple orders 113 for a given batch. To this end, the picker routes followed by pickers through the inventory storage area 103 to pick the items 109 from the inventory locations 106 may be designed for a maximum efficiency in the route followed by the picker, rather than trying to ensure all items 109 in a given transport device such as a cart or a tote are associated with a single order.

Each transport device that includes items 109 associated with a given batch may be designated with a batch identifier. Alternatively, items 109 may be placed on conveyors that move the picked items 153 from the inventory storage area 103 to the sorting station 143 in a continuous stream. To this end, the items 109 associated with a given batch are placed on conveyors so that they end up at the same sorting station 143 together for sorting as will be described. Alternatively, items 109 may not be picked in batches, where they are shuttled directly to a given one of the sorting stations 143. Ultimately, the transport of picked items 153 is accomplished so that items 109 that are part of the same order 113 are provided to the same sorting station 143 to be coalesced together before packing.

Once the order fulfillment control system 126 receives orders 113 for items 109 that are to be fulfilled by the materials handling center 100, the batch assignment system 129 generates one or more manifests that direct the picking of items 109 and the ultimate flow of items 109 to the sorting stations 143. Alternatively, the manifests may direct the picking of the items 109, where orders 113 for items 109 are not grouped in batches.

Thereafter, the sort bin assignment system 133 generates sort bin assignments 139 for each of the items 109 picked that are destined for a given sorting station 143. Each of the sort bin assignments 139 specify a corresponding one of a plurality of sort bins 156 that are designated to coalesce together the items 109 associated with a respective one of the orders 113 for packing. To this end, for each order 113, one or more sort bins 156 are designated to receive the items 109 associated with a given order 113, thereby bringing all of the items 109 together for a given order 113 in one or more sort bins 156. The sort bins 156 may be designated such that they are grouped together or in close proximity for a given order 113. Thereafter, the sorted items 159 may be sent to the packing stations 146 or other processing stations to be packaged or otherwise processed together as a single order 113.

Thus, the sort bin assignments 139 generated by the sort bin assignment system 133 may be organized in sets, where each set comprises one or more sort bin assignments 139, and each of the sets is associated with a respective one of the orders 113. Ultimately, the sort bin assignments 139 generated are stored in a memory accessible to the control system 123 for use in sorting the items 109 at a given sorting station 143.

Once items 109 reach a sorting station 143, then the items 109 are sorted using the sort bin assignments 139 after the items 109 have been picked from the inventory locations 106 as described above. For any given item 109 that reaches a sorting station 143, sorting personnel at the sorting station 143 input an identifier associated with the item 109 into the order fulfillment control system 126. Such an identifier may comprise, for example, a batch identifier and/or a product identifier. Such an identifier may be expressed as bar codes or other characters that may be input into the control system 123 using a scanner (such as a hand held scanner), a keyboard, a microphone (for audio input), or other input device as can be appreciated. To this end, the identifiers may comprise, for example, Universal Product Codes (UPC), European articles numbers (EAN), or other product identification codes as can be appreciated.

Upon input of a given identifier associated with a given item 109, the order fulfillment control system 126 proceeds to look up a respective one of the sort bin assignments 139 associated with the item 109 in the memory accessible to the control system 123 based upon the identifier. According to one embodiment, multiple identifiers may be input such as, for example, an identifier associated with a batch for the given item 109 and a second identifier associated with the item 109. The batch identifier may be associated with a cart, tote, or other transport item used to transport the item 109. Also, the batch identifier may be placed on the item 109 itself in addition to an item identifier such as a UPC code as described above. Based on the one or more identifiers input, the control system 123 identifies a respective one of the sort bin assignments 139. Thereafter, the order fulfillment control system 126 proceeds to render the respective sort bin assignment 139 on an appropriate rendering device such as a display device, printer, audio speaker, or other rendering device that directs the placement of the item 109 in a corresponding one of the sort bins 156.

According to one embodiment, the sort bins 156 used to coalesce the items 109 for a particular order 113 are adjacent to each other, or at least relatively close to each other, so as to facilitate recognition that all the items 109 in such sort bins 156 belong to the same order 113. Further, the sort bin 156 may be disposed on a cart that may be wheeled over to a packing station 146 so that the sorted items 159 in the sort bins 156 of the cart may be accessed by personnel at the packing station 146 for packaging. In such case, items 109 associated with a given order 113 may be packaged together where possible as can be appreciated.

Figure 2:
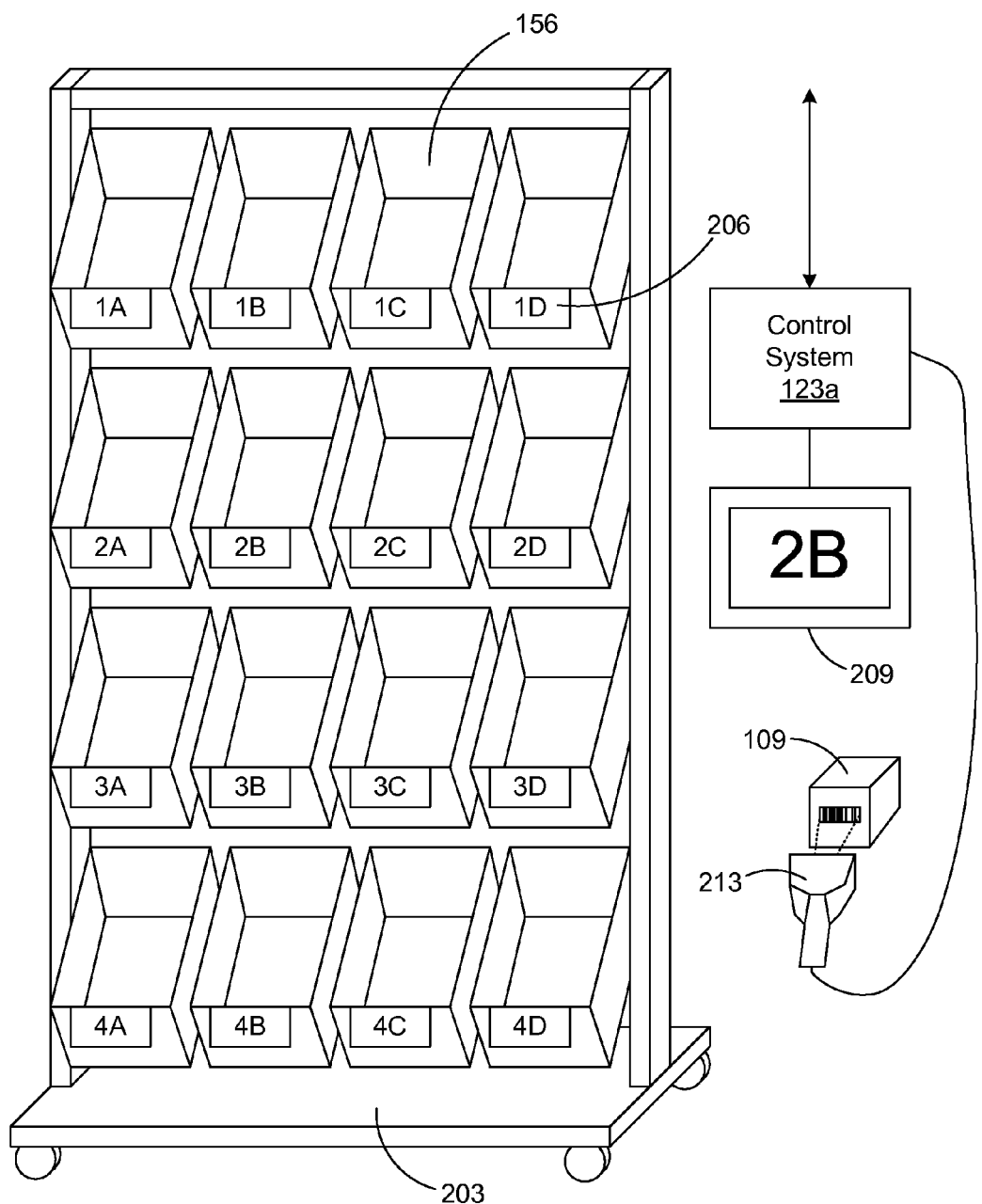
FIG. 2 is a drawing of a sorting station in the materials handling center of FIG. 1 according to an embodiment of the present disclosure.

Referring next to FIG. 2, shown as one example of a sorting cart 203 that includes a number of sort bins 156. Associated with each of the sort bins 156 is a bin label 206. Although the sort bins 156 are shown as part of the sorting cart 203, it is also understood that sort bins 156 may be included in a permanent immovable structure such as bins or cubby holes arranged on or in a wall or other structure as can be appreciated. According to one embodiment, the sorting cart 203 provides an advantage in that all of the items 109 placed in the sort bins 156 of the sorting cart 203 can be wheeled to the packing stations 146 after all items 109 associated with respective orders 113 included in the sort bins 156 have been sorted as can be appreciated.

In addition, a portion of the control system 123, denoted herein as control system 123a, is associated with the sorting station 143. The control system 123a may comprise a client such as a computer system that is linked to the control system 123 via a network, etc. A rending device 209 such as a display device is employed to display a sort bin assignment 139 associated with an item 109 for which one or more identifiers have been input as described above. To this end, an input device 213 such as a scanner may be employed to input the one or more identifiers associated with the item 109. Alternatively, the input device 213 may comprise a keyboard, microphone, or other device.

The sort bin assignment system 133 generates the sort bin assignments 139 for the items 109 separately for each order 113 within a given batch. Alternatively, the sort bin assignments 139 may be separately generated for each order 113 without regard to a batch, where a continuous stream of items 109 is sent to sorting stations 143, for example, on conveyors or via transport device.

The sort bin assignment system 133 may be configured to generate the sort bin assignments 139 for each item 109 associated with an order 113 in an order of priority from the largest one of the items 109 to the smallest one of the items 109. In particular, the sort bin assignment system 133 (FIG. 1) identifies the largest one of the items 109 associated with a given order 113 based upon which of the items 109 has the largest single dimension. This item 109 is assigned to a first sort bin 156.

Thereafter, the sort bin assignment system 133 then finds the second largest item 109 and attempts to assign the item 109 in the same sort bin 156 with the largest item 109 previously assigned in the respective sort bin 156. Based on the dimensions of the two items 109, if both items will not fit together in the same bin 156, then the sort bin assignment system 133 assigns another one of the sort bins 156 for the placement of the second largest item 109. This additional sort bin 156 may be selected based upon the fact that it is adjacent to or otherwise near or in close proximity to the first sort bin 156 to which the largest item 109 of the order 113 has been assigned. The proximity of the sort bins 156 assigned to be used to coalesce an order is such that one may drawn an association between the sort bins 156 such that it is more easily recognizable that the products subject to a single order are located in the respective sort bins 156.

Thereafter, subsequent items 109 associated with the order 113 are considered by order of size from the largest to the smallest as described above and a sort bin assignment 139 is generated for each of the items 109 for the order 113 in much the same manner as the second largest item described above. In particular, each subsequent one of the items 109 associated with the order 113 is assigned to an empty one of the sort bins 156 if such items 109 do not fit in one of the sort bins 156 to which a previously one of the larger items 109 associated with the order 113 have already been assigned. In this respect, the sort bin assignment system 133 ultimately allocates one or more sort bins 156 for the placement of each item 109 associated with a respective order 113.

In addition to the foregoing, other factors may be taken into account in assigning sort bins 156 for the sorting of items 109. For example, the weight of the item 109 may be taken into account in determining which sort bin 156 to which such item 109 should be assigned. Specifically, heavier items 109 are assigned to sort bins 156 that are lower on a given sorting cart 203 or other structure so as to minimize the need to lift heavy items. To this end, before the assignment of each item 109 associated with a given order 113, the weight of each of the items 109 may be examined to ensure that if any one of the items 109 needs to be placed in a sort bin 156 at a lower level, then all of the items 109 for the order 113 will be placed at such lower levels so that all of the sort bins 156 used to coalesce the items 109 of the order 113 are adjacent to or otherwise near each other at the given lower level.

Thus, it is possible that sort bins 156 of a given sorting cart 203 or other structure may be filled from the bottom up, from the top down, or filled randomly depending on which items 109 are selected for sorting at any given time. Further, the items 109 may be assigned to respective ones of the sort bins 156 based upon a special process that is to be applied to the respective items 109 of the order 113. For example, items 109 may need to be placed in specific sort bins 156 that are subject to gift wrapping or other processing.

Figure 3:
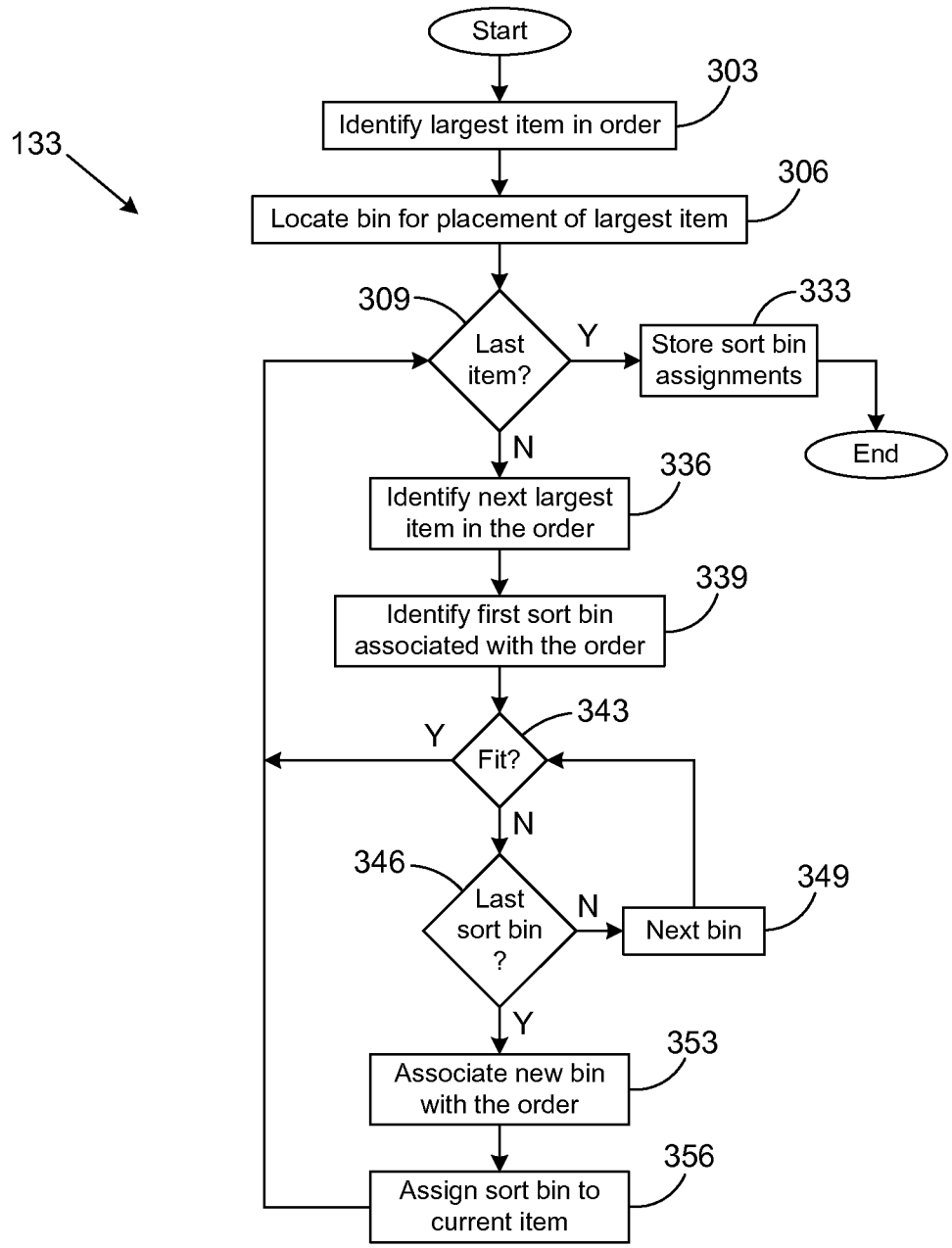
FIG. 3 is a flow chart that provides one example of the operation of a sort bin assignment system implemented as a portion of an order fulfillment control system in the materials handling center of FIG. 1 according to an embodiment of the present disclosure.

With reference to FIG. 3, as shown is one example of flow chart that illustrates an example of the operation of the sort bin assignment system 133 according to an embodiment of the present disclosure. Alternatively, the flow chart of FIG. 3 may be viewed as depicting steps of a method implemented in the control system 123 (FIG. 1) associated with the materials handling center 100 (FIG. 1) according to an embodiment of the present disclosure.

To begin, it is assumed that an order 113 (FIG. 1) has been received that identifies one or more items 109 (FIG. 1) to be shipped to a given destination address. In addition, the sort bin assignment system 133 is provided access to data that indicates that the physical dimensions of the items 109 for the given order 113. The flow chart of FIG. 3 is implemented for each order 113 received in the control system 123 for fulfillment as described above.

Beginning with box 303, the sort bin assignment system 133 identifies the largest item 109 associated with the given order 113. To this end, the largest item 109 may be deemed to be the item 109 having the largest single dimension, where the dimensions of the items 109 are expressed in three dimensions as can be appreciated. Thereafter, in box 306, the sort bin assignment system 133 locates a sort bin 156 (FIG. 2) for the placement of the largest one of the items 109 that is subject to the order 113. Then, in box 309, the sort bin assignment system 133 determines whether the largest item 109 is the last item 109 associated with the order 113. In this situation, such would be the case if there was a single item 109 associated with the order 113.

If so, then the sort bin assignment system 133 proceeds to the box 333. Otherwise, the sort bin assignment system 133 progresses to box 336. In box 333, the sort bin assignments 139 (FIG. 1) generated for the respective order 113 are stored in a memory accessible to the control system 123. Thereafter, the sort bin assignment system 133 ends as shown.

However, assuming that there are further items 109 associated with the order 113 as determined in box 309, then in box 336 the sort bin assignment system 133 identifies the next largest item 109 that is associated with the given order 113. Thereafter, in box 339, a first one of the sort bins 156 associated with the order 113 is identified. To this end, a sort bin 156 is associated with the order 113 if a sort bin assignment 139 is generated for at least one item 109 in the order 113. The first one of the sort bins 156 would include the first sort bin 156 to which an item 109 subject to the order 113 has been assigned. In box 343, the sort bin assignment system 133 determines whether the current item 109 will fit in the current considered sort bin 156 along with items 109 that were previously assigned to such sort bin 156.

If so, then the sort bin assignment system 133 reverts back to box 309. Otherwise, the sort bin assignment system 133 progresses to box 346. In box 346, the sort bin assignment system 133 determines whether the last sort bin 156 that currently holds items 109 subject to the order 113 has been considered. If not, then the sort bin assignment system 133 moves to box 349 to consider the next sort bin 156 to which prior items 109 of the order 113 have been assigned. Thereafter, sort bin assignment system 133 reverts back to box 343 as shown.

However, if the last sort bin 156 has been considered to which previous items 109 have been assigned for the order 113 in box 346, then the sort bin assignment system 133 progresses to box 353 to associate a new one of the sort bins 156 with the order 113. A new one of the sort bins 156 may comprise an empty one of the sort bins 156. Thereafter, in box 356, the current one of the items 109 is assigned to the new one of the sort bins 156. Thereafter, the sort bin assignment system 133 reverts back to box 309 to determine whether any further items 109 are associated with the orders 113 that have yet to receive a sort bin assignment 139.

Figure 4:
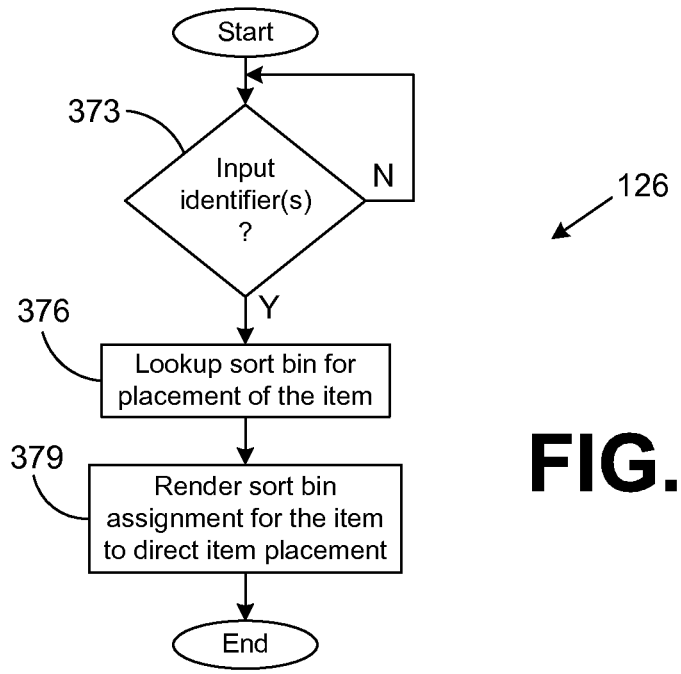
FIG. 4 is a flow chart that provides one example of the operation of a component of an order fulfillment control system implemented as a portion of an order fulfillment control system of the materials handling center of FIG. 1 according to an embodiment of the present disclosure.

With reference to FIG. 4, shown is a flow chart that depicts an example of functionality included in the order fulfillment control system 126 that directs sorting personnel of a sorting station 143 (FIG. 1) to place items 109 (FIG. 1) in respective sort bins 156 (FIG. 2) based upon the sort bin assignments 139 (FIG. 1) generated before such items 109 are picked. Alternatively, the flow chart of FIG. 4 may be viewed as steps of a method implemented in the control system 123 (FIG. 1) to direct sorting personnel as to the placement of items 109 in respect to one of the sort bins 156.

To begin, the order fulfillment control system 126 determines whether one or more identifiers associated with an item 109 have been input using an appropriate input device 213 (FIG. 2). If such is the case, then the order fulfillment control system 126 proceeds to box 376 in order to look up a respective sort bin assignment 139 for the item 109 based upon the one or more identifiers input into the system. Then, in box 379, the sort bin assignment 139 is sent to the control system 123a (FIG. 2) to be rendered on the rendering device 209 as described above. Thereafter, the order fulfillment control system 126 ends as shown.

Figure 5:
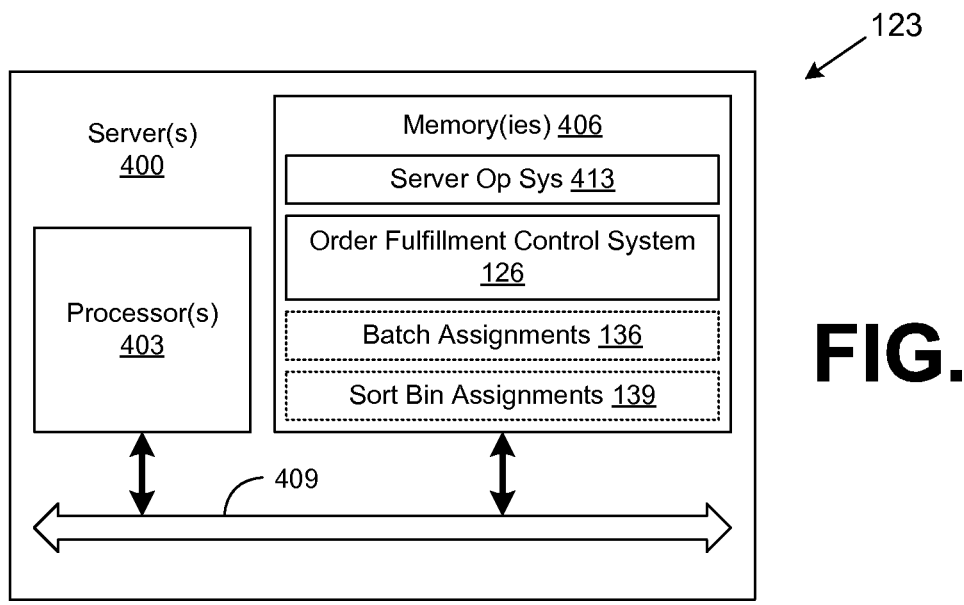
FIG. 5 is a drawing of an example of a server upon which the portions of the order fulfillment control system of FIGS. 3 and 4 are executed according to an embodiment of the present disclosure.

Referring next to FIG. 5, shown is a schematic block diagram of one example of a portion of the control system 123 that may comprise a server 400 according to an embodiment of the present disclosure. The server 400 includes a processor circuit, for example, having a processor 403 and a memory 406, both of which are coupled to a local interface 409. To this end, the server 400 may comprise, for example, a server computer with such structure. The local interface 409 may comprise, for example, a data bus with an accompanying address/control bus or other bus structure as can be appreciated.

While an example of the server 400 is shown as one embodiment of the control system 123, it is understood that the control system 123 may also include other devices such as clients, computer systems, other servers, that communicate with the server 400 to implement the various functionality as described above as can be appreciated.

Stored in the memory 406 are both data and several components that are executable by the processor 403. In particular, stored in the memory 406 are the order fulfillment control system 126, including the batch assignment system 129 and the sort bin assignment system 133, the batch assignments 136, the sort bin assignments 139, and other data/components. In addition, a server operating system 413 may be stored in the memory 406 and executed by the processor 403 as can be appreciated.

Also, the batch assignments 136, the sort bin assignments 139, and data may be stored in a data store, for example, in the memory 406 or some other memory accessible to the server 400. It is understood that there may be other applications that are stored in the memory 406 and are executable by the processor 403 as can be appreciated. Also, other data may be stored in the memory 406 and accessed by the processor 403 such as manifest expressing picker routes and/or other data. Where any component discussed herein is implemented in the form of software, any one of a number of programming languages such as, for example, C, C++, Java, Java Script, Perl, Python, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, or source code that may be expressed in proper format such as object code that is capable of being loaded into a random access portion of the memory 406 and executed by the processor 403, etc. An executable program may be stored in any portion or component of the memory 406 including, for example, random access memory, read-only memory, a hard drive, compact disk (CD), floppy disk, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components executed on the server 400 as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowcharts of FIGS. 3 and 4 show the functionality and operation of portions of the order fulfillment control system 126 including the operation of the sort bin assignment system 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the order fulfillment control system 126, including the batch assignment system 129 and the sort bin assignment system 133, and/or any other component implemented in the server 400 as described above comprises software or code, the same can be embodied in any computer-readable medium for use by or in connection with an instruction execution system such as, for example, a processor in a computer system or other system. In this sense, the systems or components executed in the server 400 or other devices may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising code that:
   generates a manifest that directs a picking of a plurality of items from a plurality of inventory locations in a materials handling center for fulfillment of a plurality of orders;
   generates a plurality of sort bin assignments for individual ones of the plurality of orders, the plurality of sort bin assignments being generated to coalesce a subset of the plurality of items associated with the individual ones of the plurality of orders for packing, the plurality of sort bin assignments being generated for the plurality of orders based at least in part on whether a process is to be applied to at least one of the plurality of items in an order of priority from a largest one of the plurality of items to a smallest one of the plurality of items;
   identifies a respective one of the plurality of sort bin assignments associated with at least one of the plurality of items based at least in part on an identifier associated with the at least one of the plurality of items; and
   causes a respective one of the plurality of sort bin assignments corresponding to the at least one of the plurality of items to be rendered upon a display to direct placement of the at least one of the plurality of items in the respective one of the plurality of sort bin assignments.

2. The non-transitory computer-readable medium of claim 1, wherein the identifier further comprises a batch identifier or a product identifier.

3. The non-transitory computer-readable medium of claim 1, wherein the code that generates the plurality of sort bin assignments further comprises code that:
   assigns a largest one of the plurality of items in the subset to one of a plurality of sort bins corresponding to the respective one of the plurality of sort bin assignments; and
   determines whether a second largest one of the plurality of items in the subset fits in the one of the plurality of sort bins with the largest one of the plurality of items.

4. The non-transitory computer-readable medium of claim 1, wherein the program further comprises code that receives the identifier from an input device comprising a scanner, a keyboard, or a microphone.

5. A system, comprising:
   at least one computing device; and
   an order fulfillment application executed in the at least one computing device, the order fulfillment application causing the at least one computing device to:
      generate a manifest that directs a picking of a plurality of items from a plurality of inventory locations in a materials handling center;
      generate a plurality of sort bin assignments for individual ones of a plurality of orders, the plurality of sort bin assignments being generated to coalesce a subset of the plurality of items associated with the individual ones of the plurality of orders for packing, the plurality of sort bin assignments being generated for the plurality of orders based at least in part on a weight associated with individual ones of the plurality of items; and identify a respective one of the plurality of sort bin assignments associated with at least one of the plurality of items based at least in part on an identifier associated with the at least one of the plurality of items.

6. The system of claim 5, wherein the order fulfillment application further causes the at least one computing device to cause a respective one of the plurality of sort bin assignments corresponding to the at least one of the plurality of items to be rendered upon a display to direct placement of the at least one of the plurality of items in the respective one of the plurality of sort bin assignments.

7. The system of claim 5, wherein the order fulfillment application further causes the at least one computing device to receive the identifier from an input device.

8. The system of claim 5, wherein the plurality of sort bin assignments are generated for a respective one of the plurality of orders in an order of priority from a largest one of the plurality of items to a smallest one of the plurality of items.

9. The system of claim 5, wherein the order fulfillment application causing the at least one computing device to generate the plurality of sort bin assignments further causes the at least one computing device to:
assign a largest one of the plurality of items in the subset to one of a plurality of sort bins corresponding to the respective one of the plurality of sort bin assignments; and
assign a second largest one of the plurality of items in the subset to the one of the plurality of sort bins in response to the second largest one of the plurality of items in the subset fitting in the one of the plurality of sort bins with the largest one of the plurality of items.

10. The system of claim 5, wherein the order fulfillment application causing the at least one computing device to generate the plurality of sort bin assignments further causes the at least one computing device to:
assign a largest one of the plurality of items in the subset to a first one of a plurality of sort bins corresponding to the respective one of the plurality of sort bin assignments; and
assign a second largest one of the plurality of items in the subset to a second one of the plurality of sort bins responsive to the second largest one of the plurality of items in the subset not fitting in the first one of the plurality of sort bins with the largest one of the plurality of items.

11. The system of claim 10, wherein the second one of the plurality of sort bins is adjacent to or is in close proximity to the first one of the plurality of sort bins.

12. The system of claim 10, wherein the second one of the plurality of sort bins is empty.

13. A method, comprising:
generating, by at least one computing device, a manifest that directs a picking of a plurality of items from a plurality of inventory locations in a materials handling center in fulfillment of an order;
generating, by the at least one computing device, a plurality of sort bin assignments for a subset of the plurality of items associated with the order, the plurality of sort bin assignments being generated to coalesce the plurality of items in the subset associated with the order for packing, the plurality of sort bin assignments being generated for the order based at least in part on a weight associated with individual ones of the plurality of items;
receiving, by the at least one computing device, an indication of an identifier associated with at least one of the plurality of items from an input device; and
identifying, by the at least one computing device, a respective one of the plurality of sort bin assignments associated with the at least one of the plurality of items based at least in part on the identifier.

14. The method of claim 13, further comprising causing, by the at least one computing device, the respective one of the plurality of sort bin assignments corresponding to the at least one of the plurality of items to be rendered upon a display to direct placement of the at least one of the plurality of items in the respective one of the plurality of sort bin assignments.

15. The method of claim 13, wherein the order of priority further comprises an order of size from a largest one of the plurality of items in the subset to a smallest one of the plurality of items in the subset.

16. The method of claim 13, wherein generating, by the at least one computing device, the plurality of sort bin assignments for the subset of the plurality of items further comprises generating at least a portion of the plurality of sort bin assignments such that heavier ones of the plurality of items are assigned to a plurality of sort bins lower on a structure comprising the sort bins.

17. The method of claim 13, further comprising:
assigning, by the at least one computing device, a largest one of the plurality of items in the subset to one of a plurality of sort bins corresponding to the respective one of the plurality of sort bin assignments; and
assigning, by the at least one computing device, a second largest one of the plurality of items in the subset to the one of the plurality of sort bins in response to the second largest one of the plurality of items in the subset fitting in the one of the plurality of sort bins with the largest one of the plurality of items.

18. The method of claim 13, wherein the input device further comprises a scanner, a keyboard, or a microphone.

19. The method of claim 13, further comprising:
assigning, by the at least one computing device, a largest one of the plurality of items in the subset to a first one of a plurality of sort bins corresponding to the respective one of the plurality of sort bin assignments; and
assigning, by the at least one computing device, a second largest one of the plurality of items in the subset to a second one of the plurality of sort bins in response to the second largest one of the plurality of items in the subset not fitting in the first one of the plurality of sort bins with the largest one of the plurality of items.

20. The method of claim 19, wherein the second one of the plurality of sort bins is adjacent to or is in close proximity to the first one of the plurality of sort bins.

* * * * *